United States Patent [19]

Mennicke et al.

[11] 4,000,965

[45] Jan. 4, 1977

[54] METAL COMPLEX DYESTUFFS

[75] Inventors: Winfried Mennicke, Leverkusen, Germany; Peter Suchanek, Scotch Plains; Peter F. Vogt, Berkeley Heights, both of N.J.

[73] Assignee: Bayer Aktiengesellschaft, Leverkusen, Germany

[22] Filed: Jan. 29, 1975

[21] Appl. No.: 545,119

[30] Foreign Application Priority Data

Jan. 30, 1974 Germany ............................ 2404314
Sept. 11, 1974 Germany ............................ 2443483

[52] U.S. Cl. ........................................ 8/26; 8/42 B; 8/43; 8/173; 8/174; 260/145 A; 260/145 B; 260/149

[51] Int. Cl.² ............... C09B 27/00; C09B 45/48; D06P 1/10

[58] Field of Search .................. 8/42 B, 43, 26; 260/145 A, 145 B, 149

[56] References Cited

UNITED STATES PATENTS

| | | | |
|---|---|---|---|
| 3,617,176 | 11/1971 | Machatzke | ............................ 8/42 |
| 3,625,937 | 12/1971 | Scholl | ............................ 260/145 B |
| 3,704,086 | 11/1972 | Bayew et al. | ............................ 8/42 |

*Primary Examiner*—Joseph L. Schofer
*Assistant Examiner*—A. L. Clingman
*Attorney, Agent, or Firm*—Plumley and Tyner

[57] ABSTRACT

1:2 metal complex dyes in the form of the lithium salts and concentrated solutions thereof are used for the preparation of dye baths and printing pastes for dyeing and printing fibrous materials containing nitrogen. The concentrated solutions are obtained by chromating the non-metallized dyes in hydroxyl group containing solvents in the presence of alkaline lithium salts with chromium acetate or chromium formate.

18 Claims, No Drawings

METAL COMPLEX DYESTUFFS

The invention relates to lithium salts of 1:2 metal complex dyestuffs. It also relates to water-miscible, stable, concentrated solutions of 1:2 metal complex dyestuffs. Co-pending, commonly owned application Le A 16007, German Application No. P 2444736.7, filed in the U.S. simultaneously herewith relates to process for the preparation of concentrated solutions of 1:2 azo- and azomethine complex dyestuffs, characterised in that the metallisable dystuffs, in solvents containing hydroxyl groups, are chromed with chromium acetate or chromium formate in the presence of organic bases and optionally in the presence of water.

It is known that dyeing liquors and printing pastes can be produced with dyestuff solutions. This avoids disadvantages which can arise when using the same dyestuffs as finely ground powders or finely disperse pastes. Thus, for example, dyestuff powders tend to form dust, which makes them difficult to handle and meter. The solubility in water of pulverulent dyestuff preparations is frequently insufficient for dyeing in deep colour shades. In that case, undissolved dyestuff particles deposit on the substrate to be dyed and result in poor rub resistance of the dyeing. On the other hand, pourable finely disperse pastes show stability problems: the finely divided state can change, due to agglomerations for demixing, as a result of exposure to temperatures which are too high or too low, or as a result of prolonged storage.

In addition to not suffering from these shortcomings, dyestuff solutions are distinguished by the fact that they can easily be metered in continuous dyeing processes, above all in the topping process.

It has now been found that the lithium salts of 1 : 2 metal complex dyestuffs are particularly suitable for the preparation of concentrated solutions and that concentrated, water-miscible, stable solutions can be obtained from metal complex dyestuffs and organic solvents containing hydroxyl groups, or mixtures of water and organic solvents containing hydroxyl groups, in the presence of alkaline lithium salts, which result in the formation of the 1 : 2 complex lithium salts.

The dyestuffs on which the solutions according to the invention are based are, in general, 1:2 chromium or 1:2 cobalt complexes of monoazo, disazo or polyazo dyestuffs or azomethine dyestuffs which, before metallisation, contain o,o'-dihydroxy-, o-hydroxy-o'-amino-, o-hydroxy-o'-alkoxy-, o-hydroxy-o'-carboxy or o-alkoxy-o'-amino-azo or -azomethine groups. The dyestuffs can be free from acid groups or can carry one or two acid groups, preferably sulphonic acid groups or carboxylic acid groups. The two complex-forming dyestuffs from which the 1:2 metal complex is built up can be identical or different; mixtures of 1:2 metal complex dyestuffs, such as are produced on mixed metallisation of two or more dyestuffs capable of complex formation, can also be used. Numerous examples of such dyestuffs are to be found in the patent literature, for example in German Patent Specifications and German Offenlegungsschriften Nos. (German Published Specifications) 870,305 937,367, 940,483, 945,432, 953,827, 957,506, 960,485, 1,005,644, 1,047,340, 1,049,021, 1,072,338, 1,077,351, 1,191,058, 1,270,204, 1,254,785, 1,270,204, 1,444,635, 1,444,655, 1,444,658, 1,544,361, 2,119,830, 1,008,254, 1,012,007, 1,023,539, 1,079,247, 1,111,318, 1,133,846, 1,156,913, 1,265,324, 1,271,857, 1,444,605, 1,544,580, 1,619,649, 1,644,143, 1,902,867, 1,952,305, and 2,210,260, French patent specifications Nos. 1,353,364, 1,380,632, 950,916, 1,161,640, 1,269,496, 1,269,497, 1,272,728, 1,272,729, 1,273,542, 1,352,623, 1,376,128, and 1,518,833, British patent specifications Nos. 988,829, and 995,361 and Belgian patent specifications Nos. 553,658, 564,094, 553,480, 569,084 and 717,450.

The organic solvents, containing hydroxyl groups, which are suitable for the preparation of the stock solutions are compounds liquid at 25° C, for example alcohols, glycols, their mono-ethers and mono-esters, dihydroxy-ethers, their mono-ethers and mono-esters, dihydroxypolyethers, their ethers and esters, polyhydroxy compounds and their ethers and esters. In detail, the solvents containing hydroxyl groups may be represented by the formulae I and II:

$$R\text{-}CH_2\text{-}OH \qquad \qquad I$$

wherein

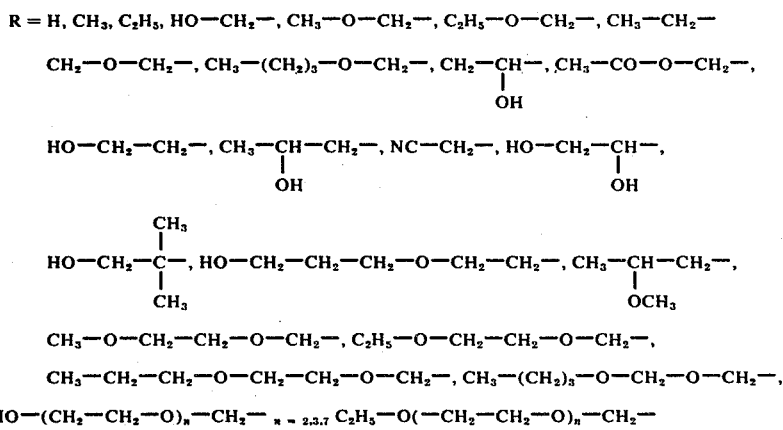

$$R'\text{—}CH\text{—}R'' \qquad (II)$$
$$| $$
$$OH$$

wherein

R' and R'' = $C_2H_5$—O—$CH_2$, $CH_3$ and $CH_2$—$CH_2$—CH—$CH_3$, or $CH_3$ and $CH_2$—C(—$CH_3$)($CH_3$)—OH Preferred solvents are the monoalkyl ethers of glycol and of diethylene glycol, wherein the alkyl radicals contain 1 to 4 C atoms.

Alkaline lithium salts which can be used are lithium hydroxide, secondary or tertiary lithium phosphates and lithium carbonate.

The stock solutions according to the invention are characterised by the following composition: 10 – 40% by weight of a complex metal dyestuff, 0 – 50% by weight of water, 20 – 80% by weight of an organic solvent containing hydroxyl groups and 2 – 12% by weight of the lithium salt which is alkaline in water.

The amount of the lithium salt which is alkaline in water is so chosen that the pH of the solution is preferably between 4 and 11.

In spite of the high concentration of dyestuff, the solutions can additionally contain up to 50% by weight of water. The possible high proportion of water permits simplifications in the preparation of the dyestuff solutions. Thus, the solutions can be prepared from the moist press cake of the abovementioned metal complex dyestuffs, and drying costs, and problems due to dust, are thereby avoided.

An additional simplification is to metallise the moist metal-free intermediate in a suitable solvent of the formula I or II with a cobalt donor or chromium donor in the presence of a base as defined above. In this way, the metallisation reaction and the preparation of the solution are combined into one step. The solutions can also be prepared by the one-pot process, by carrying out the diazotisation reaction and coupling reaction in water in the usual way and subjecting the resulting suspension of the coupling product to a metallisation reaction under the abovementioned conditions.

If an unsymmetrical chromium mixed complex is being prepared, a solution of this complex dyestuff can again be obtained direct if, for example, the moist pastes of a chromium-1:1 complex dyestuff and of an azo or azomethine dyestuff capable of complex formation are allowed to react with one another in a solvent of the above definition and in the presence of one of the abovementioned bases.

Possible chromium donors are chromium fluoride, chromium chloride, chromium sulphate, chromium formate or chromium acetate; suitable cobalting agents are cobalt chloride, cobalt sulphate, cobalt formate or cobalt acetate.

In the case of a cobalting reaction, the metal-free intermediates of the abovementioned metal complex dyestuffs, if they carry a sulphonamide group of the general formula III $-SO_2-NH-R^{III}$      III wherein $R^{III}$ = H, alkyl, aryl or acyl, are advantageously converted into the sodium salts of this sulphonamide group. The cobalting of such dyestuffs with a group of the general formula IV $-SO_2-\overline{N}-R^{III}]^-$ $Na^+$      IV wherein $R^{III}$ has the abovementioned meaning requires, according to equation 1, only half an equivalent of lithium hydroxide.

$8[H_2R^{IV}-SO_2-N-R^{III}]^-Na^+ + O_2$ (atmospheric oxygen) $+ 4LiOH + 4CoCl_2 \rightarrow [4\ R^{III}-NH-SO_2-R^{IV}=Co=R^{IV}-SO_2-NH-R^{III}]^-Li^+ + 8NaCl + 6H_2O$   (Equation 1)

wherein $R^{III}$ has the abovementioned meaning and $H_2R^{IV}$ is the radical of an abovementioned dyestuff which is free from metal and from sulphonamide groups.

A particular advantage of the invention is that following the reaction route outlined in equation 1 and using only very small amounts of LiOH in the presence of a solvent, containing hydroxyl groups, of the formula I or II, highly concentrated solutions are obtained, in which the dyestuff content can be up to 40% by weight. In the same way, similar concentrated solutions of cobalt complex dyestuffs containing sulphonic acid groups or carboxylic acid groups can also be prepared.

The concentrated solutions obtainable by the methods described above remain liquid even on prolonged storage or at temperatures down to −15° C.

If a solution of a water-soluble dyestuff in water-miscible solvents is introduced into water, a homogeneous solution of this dyestuff is again obtained. Hitherto, on the other hand, concentrated solutions of water-insoluble metal complex dyestuffs in solvents containing hydroxyl groups gave suspensions, in which the dyestuff had largely precipitated, on dilution with water. It was now surprising that the concentrated dyestuff solutions obtained in the presence of alkaline lithium salts were miscible with water in any proportion, without precipitation of dyestuff, even if the solution concerned was of water-insoluble 1:2 metal complex dyestuffs, that is to say 1:2 metal complex dyestuffs which were free from sulphonic acid groups, carboxylic acid groups, sulphonamide groups and alkylsulphonyl groups.

The stock solutions according to the invention are water-miscible and can be used for the preparation of dye baths or printing pastes for dyeing and printing nitrogen-containing fibrous materials, such as wool, silk and leather, as well as synthetic polyamide or polyurethane fibres, and also fibre mixtures, for example a mixture of wool and polyamide. The dyeing process is preferably carried out in a neutral to weakly acid bath, for example in a bath containing acetic acid. When dyeing from a bath, the usual dyeing auxiliaries, such as sodium sulphate, addition products of ethylene oxide to alcohols or amines, or sulphonation products of castor oil, can be added.

EXAMPLE 1

A moist paste of the sodium salt of 1 mol of monoazo dyestuff from diazotised 2-aminophenol-4-sulphonamide and acetoacetic acid anilide is suspended in 650 g of diethylene glycol monoethyl ether and after addition of about 0.6 mol of LiOH.H$_2$O the mixture is stirred for about 1 hour until the lithium compound has dissolved. After addition of 0.5 mol of CoCl$_2$.6H$_2$O the very mobile suspension changes, over the course of about 30 minutes, into the solution of the cobalt complex, if the pH is kept at a value of 8.5 during the metallisation reaction by sprinkling a further 0.1 mol of LiOH.H$_2$O into the mixture. After standing for 12 hours, small amounts of cobalt hydroxide are filtered off. The filtrate undergoes no change on prolonged storage or at temperatures below the freezing point and can be diluted with any desired amounts of water without causing precipitation of dyestuff.

Comparably concentrated, stable dyestuff solutions are obtained if instead of diethylene glycol monoethyl ether other solvents containing hydroxyl groups are used, such as glycol, monoethyl glycol, diethylene glycol, diethylene glycol monomethyl ether, diethylene glycol monopropyl ether, diethylene glycol monobutyl ether, triethylene glycol, triethylene glycol monoethyl ether, propylene glycol or dipropylene glycol.

The solutions of other 1:2 cobalt complex dyestuffs and cobalt mixed complex dyestuffs can be prepared analogously. The table which follows shows the metal-free intermediates and the colour shades of such cobalt complex dyestuffs.

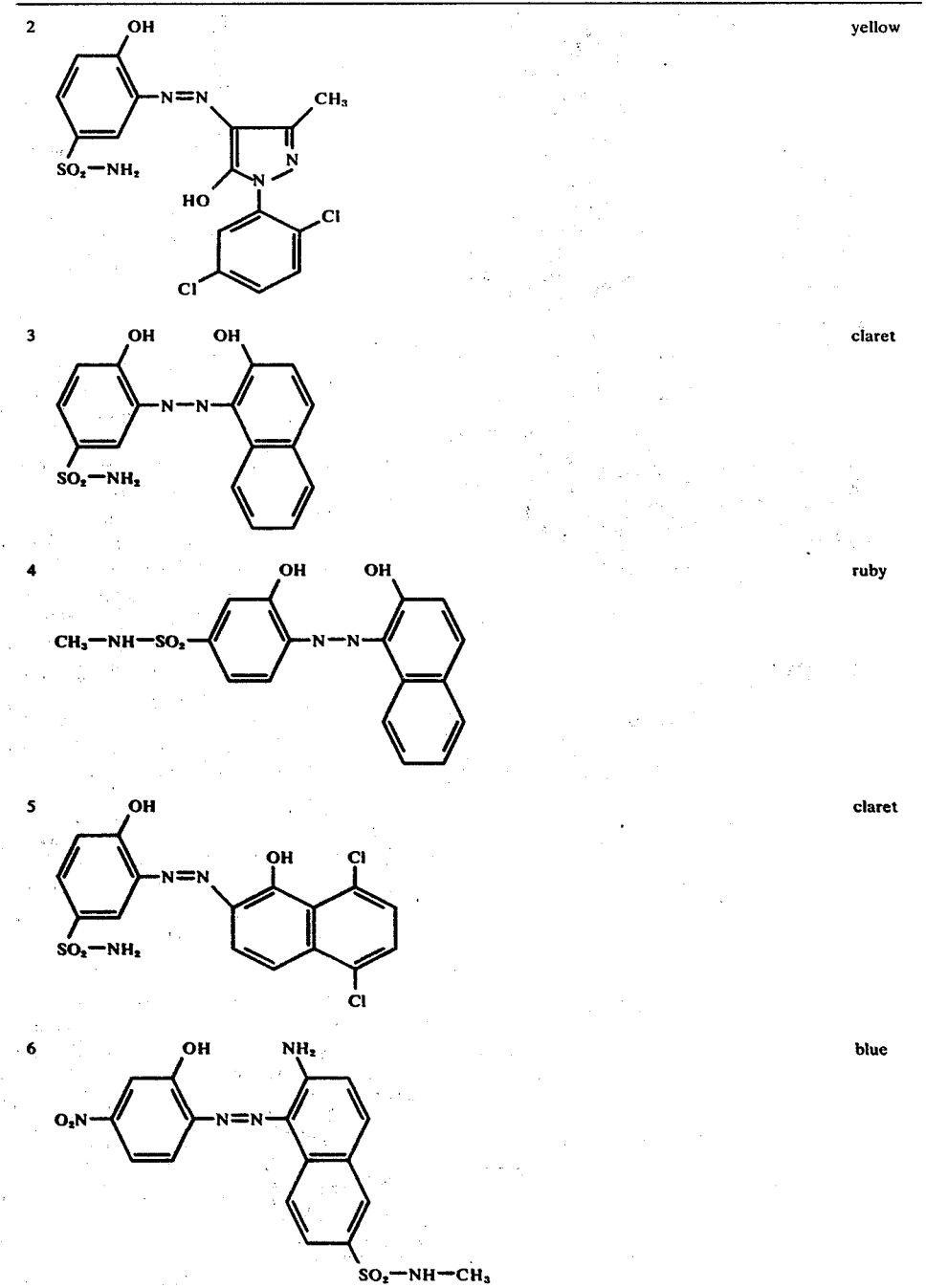

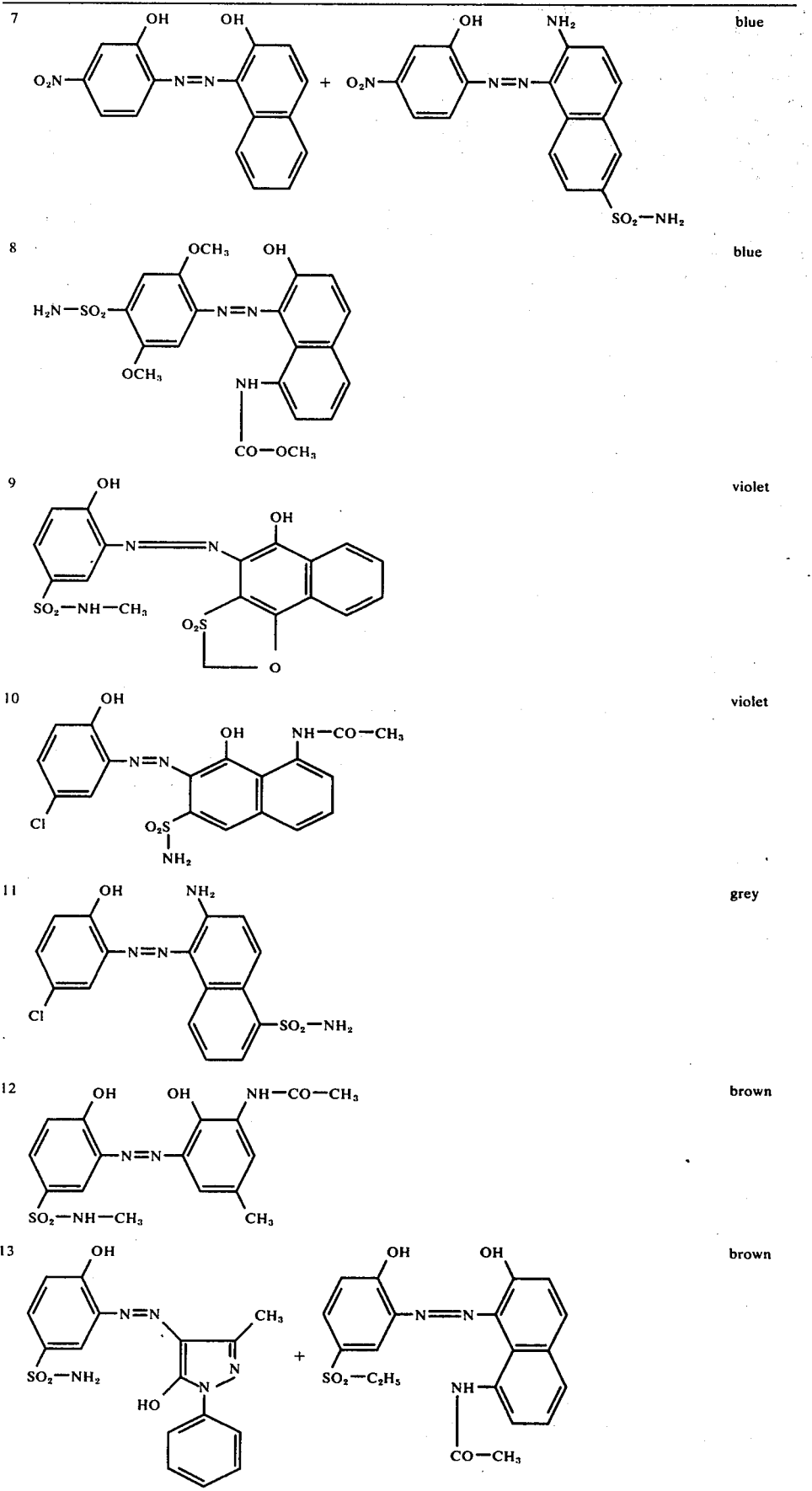

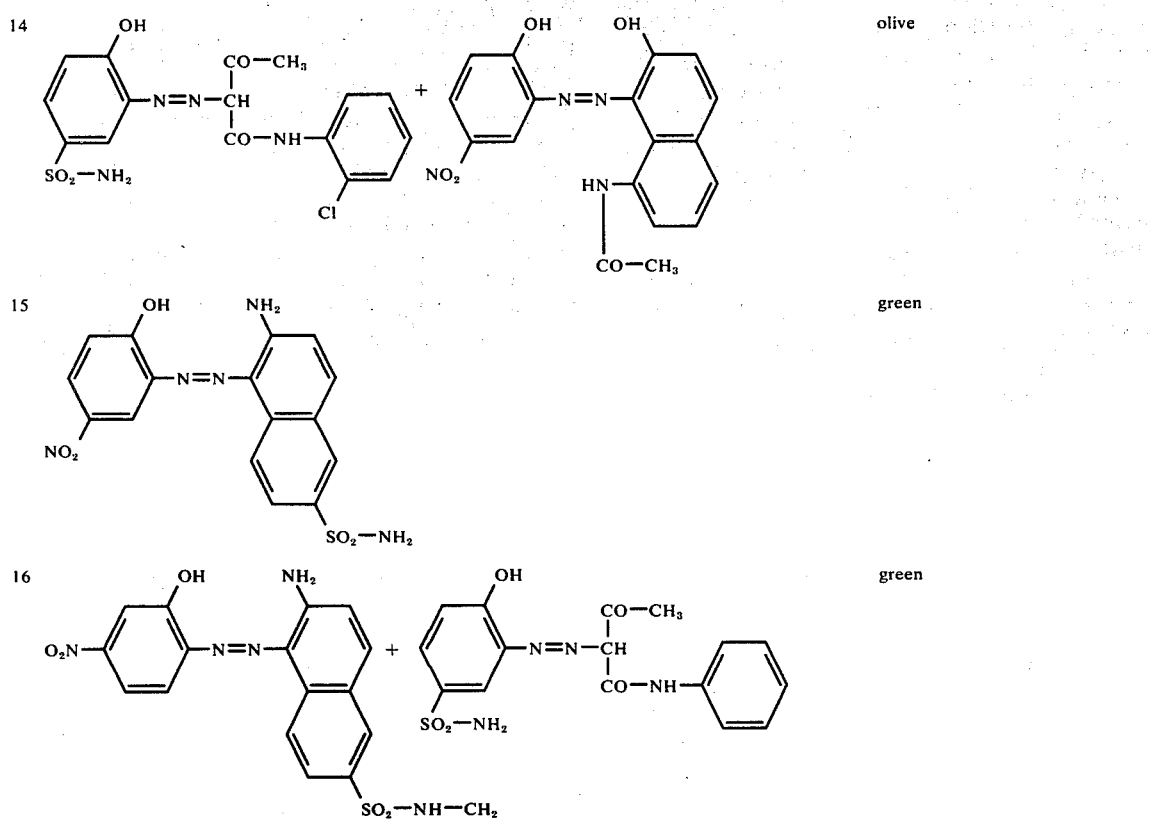

EXAMPLE 17

To dye 1,000 g of wool yarn, 20 g of the dyestuff solution described under Example 1 are introduced into 12 l of water. 30 ml of 30% strength acetic acid and 20 g of a condensation product of naphthalene-2-sulphonic acid and formaldehyde are added and the mixture is warmed to 40° – 50° C. The dyeing liquor is pumped through the goods to be dyed for 10 minutes at this temperature before then being heated to the boil over the course of 30 minutes. After a boiling time of approx. 1 hour the dyeing is finished. A yellow dyeing with good fastness properties is obtained.

EXAMPLE 18

To dye wool tops by the pad-steam process, a solution of 20 g of the dyestuff solution described under Example 1 in 300 ml of water, and a solution of 15 g of a thickener based on carob bean flour in 300 ml of water, are thoroughly stirred together. 25 g of lauric acid diethanolamide and 60 ml of 30% strength acetic acid are added and the mixture is made up to a volume of 1 litre with water. 1,000 g of wool tops are impregnated on a padder with the liquor thus prepared, and are then steamed. A yellow wool dyeing of good rub resistance and fastness to washing and light is obtained.

EXAMPLE 19

To dye 1,000 g of synthetic polyamide yarn, 20 g of the dyestuff solution obtained in Example 1 are dissolved in a dye bath which contains 40 ml of 30% strength acetic acid and 20 g of ammonium phosphate. After briefly circulating the dyeing liquor through the goods to be dyed, the liquor is heated evenly to the boil over the course of 30 minutes and is kept at the boil for 45 minutes. It is cooled, the goods are rinsed with lukewarm water and a yellow polyamide dyeing with good fastness properties is obtained.

EXAMPLE 20

20 g of the dyestuff solution mentioned in Example 1 are diluted with 100 ml of water. 4 g of ammonium sulphate are added and the solution is converted into a dye paste with 180 g of a paste-forming agent. Wool is printed with this dye paste and is then steamed at 100° – 105° to fix the dyestuff. After washing with water, a yellow dyeing of good fastness to light and good wet fastness properties is obtained.

EXAMPLE 21

A mixture of 0.25 mol of monoazo dyestuff from diazotised 4-sulphonamido-2-aminophenol and β-naphthol, 0.40 mol of monoazo dyestuff from diazotised 4-nitro-2-aminophenol and 1-phenyl-3-methyl-5-pyrazolone and 0.35 mol of monoazo dyestuff from diazotised 4-nitro-2-aminophenol and 1-acetylamino-7-naphthol is heated to 100° C in 700 g of diethylene glycol monoethyl ether. On addition of 1 mol of lithium carbonate, a dispersion forms, which after dropwise addition of 360 g of aqueous chromium acetate solution (10.5% by weight of $Cr_2O_3$) over the course of approx. 1 hour changes into the mobile solution of the corresponding 1:2 chromium complex dyestuffs and chromium mixed complex dyestuffs. The mixture is allowed to cool and after standing for 12 hours the precipitate which has separated out is filtered off.

Brown dyeings and prints with good fastness properties can be produced on wool and polyamide fibres with the solution thus obtained, similarly to the description given in Examples 11 to 14.

Instead of the solvent diethylene glycol monoethyl ether it is also possible to use, in this example, the solvents glycol, monoethyl glycol, diethylene glycol, diethylene glycol monomethyl ether, diethylene glycol monopropyl ether, diethylene glycol monobutyl ether, propylene glycol or dipropylene glycol.

EXAMPLE 22

1 mol of the dyestuff mixture mentioned in the preceding example in 700 ml of diethylene glycol monoethyl ether is warmed to 100° and 1 mol of LiOH.H$_2$O is added. 380 g of a 20.7% strength by weight aqueous CrCl$_3$ solution is allowed to run into the dispersion over the course of 1 hour. The chroming reaction is then complete shortly afterwards, provided the pH is kept in the range 5 – 8 by simultaneous addition of approx. 1 mol of LiOH.H$_2$O. After cooling, the salts which have precipitated are filtered off and a mobile brown solution is obtained, which is water-miscible without precipitation of dyestuff.

Solutions of other 1:2 chromium complex dyestuffs and chromium mixed complex dyestuffs can also be prepared in the manner indicated in Examples 21 and 22. The table which follows shows the metal-free intermediates and the shade of such chromium complex dyestuffs.

23 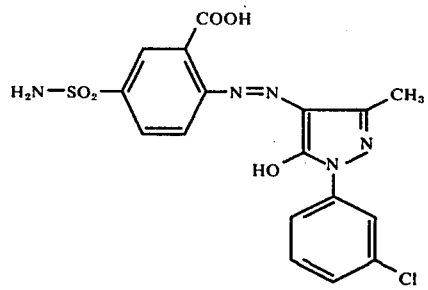 yellow

24 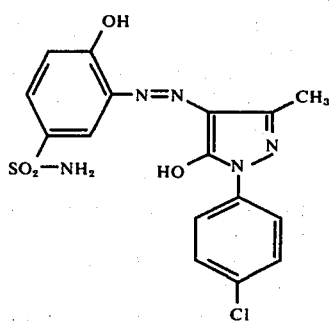 orange

25 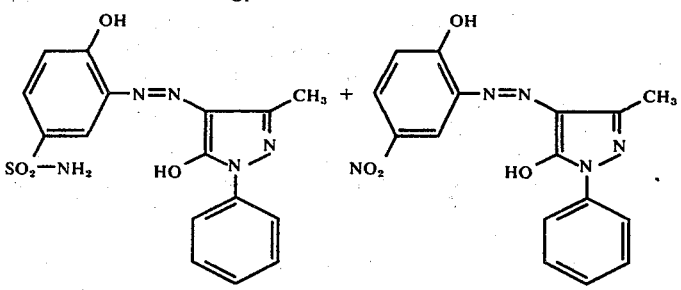 orange

26 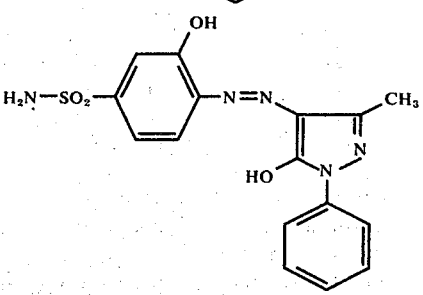 scarlet

-continued
| | | |
|---|---|---|
| 27 | 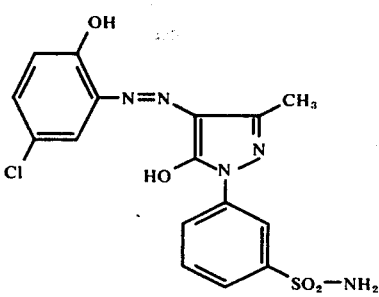 | red |
| 28 | 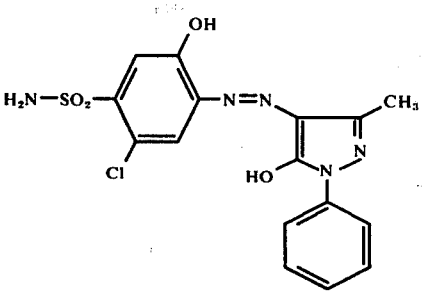 | red |
| 29 | 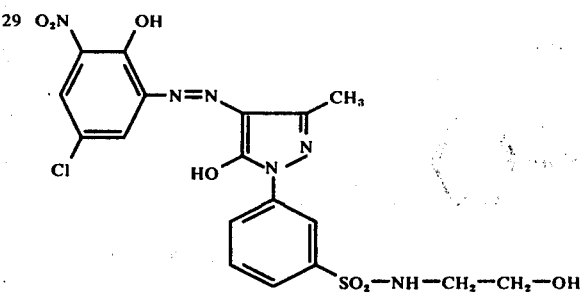 | red |
| 30 | 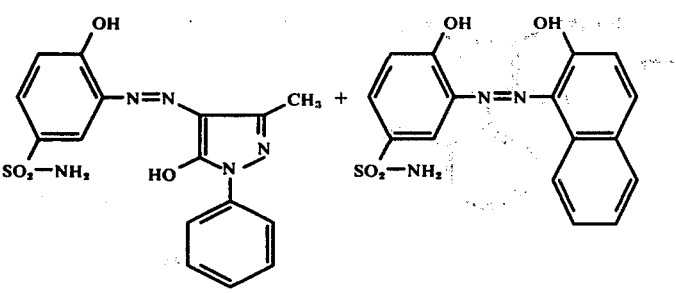 | claret |
| 31 | 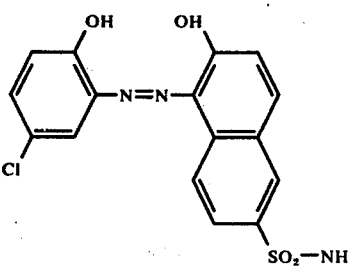 | violet |
| 32 | 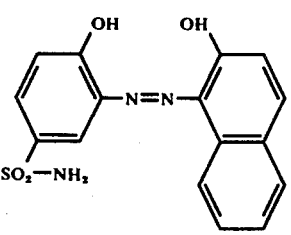 | violet |

-continued
| | | |
|---|---|---|
| 33 | 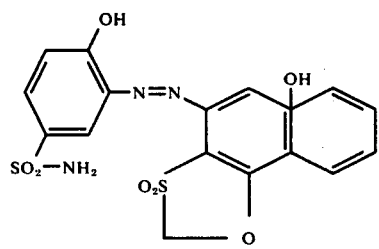 | blue |
| 34 | 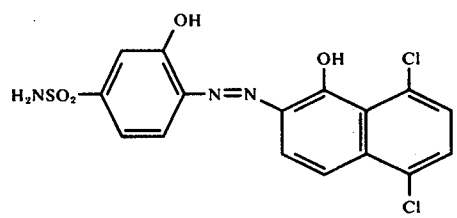 | blue |
| 35 | 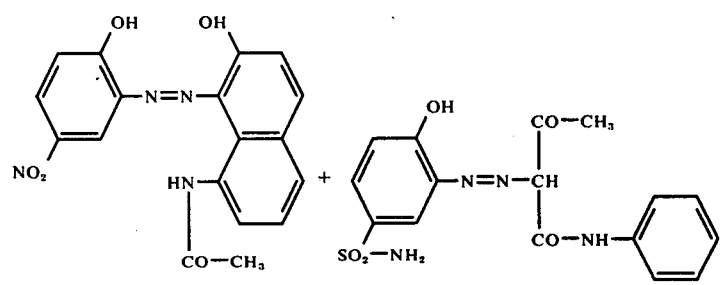 | olive |
| 36 | 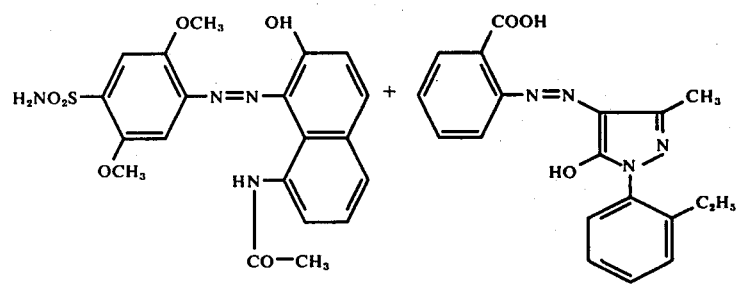 | green |
| 37 | 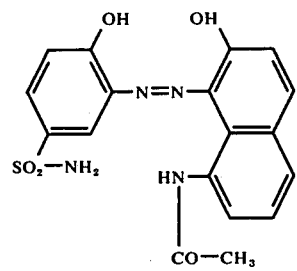 | grey |
| 38 | 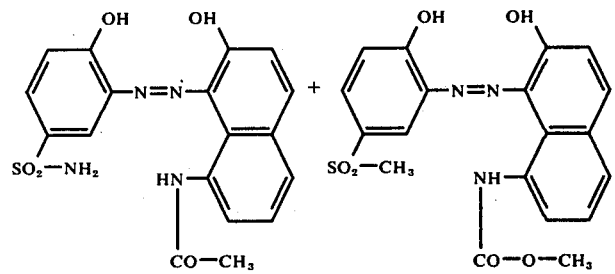 | grey |

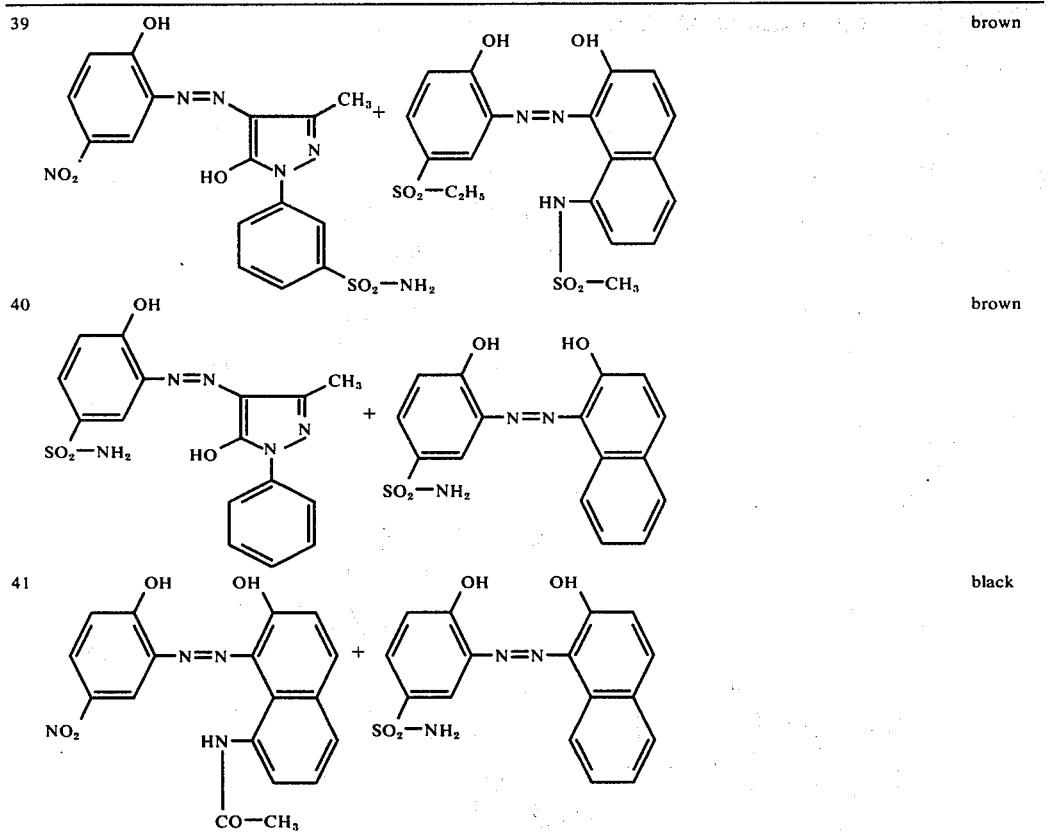

| | | |
|---|---|---|
| 39 | | brown |
| 40 | | brown |
| 41 | | black |

EXAMPLE 42

The paste of 0.5 mol of the 1:1 chromium complex dyestuff obtained by reaction of diazotised 4-chloro-2-aminophenol-6-sulphonic acid with 1-(2,5-dichlorophenyl)-3-methyl-5-pyrazolone and subsequent chroming is suspended in 250 g of diethylene glycol monoethyl ether and 25 g of lithium carbonate. The paste of 0.5 mol of the monoazo dyestuff from diazotised 4-nitro-2-aminophenol and 1-phenyl-3-methyl-5-pyrazolone is added, the whole is warmed to 70° – 80° C and the pH is kept in the weakly alkaline range (pH 8 – 9) by addition of a total of about 35 g of lithium carbonate. The mixture is stirred for approx. 2 hours longer until the two dyestuffs employed as starting compounds have been converted, and a solution of the chromium mixed complex, which in the form of its free acid corresponds to the following formula:

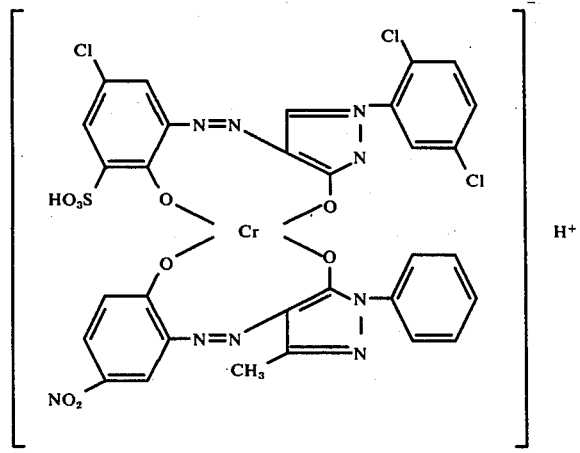

is obtained. The clear concentrated solution thus prepared is stable even at temperatures below the freezing point and can be diluted in any proportion with water, without precipitation of dyestuff.

Concentrated stable solutions of other unsymmetrical chromium mixed complexes are obtained analogously. In addition to diethylene glycol monoethyl ether, the solvents mentioned in Example 21 can also be used as solvents. The table which follows shows the metal-free intermediates and the shade of such chromium mixed complexes.
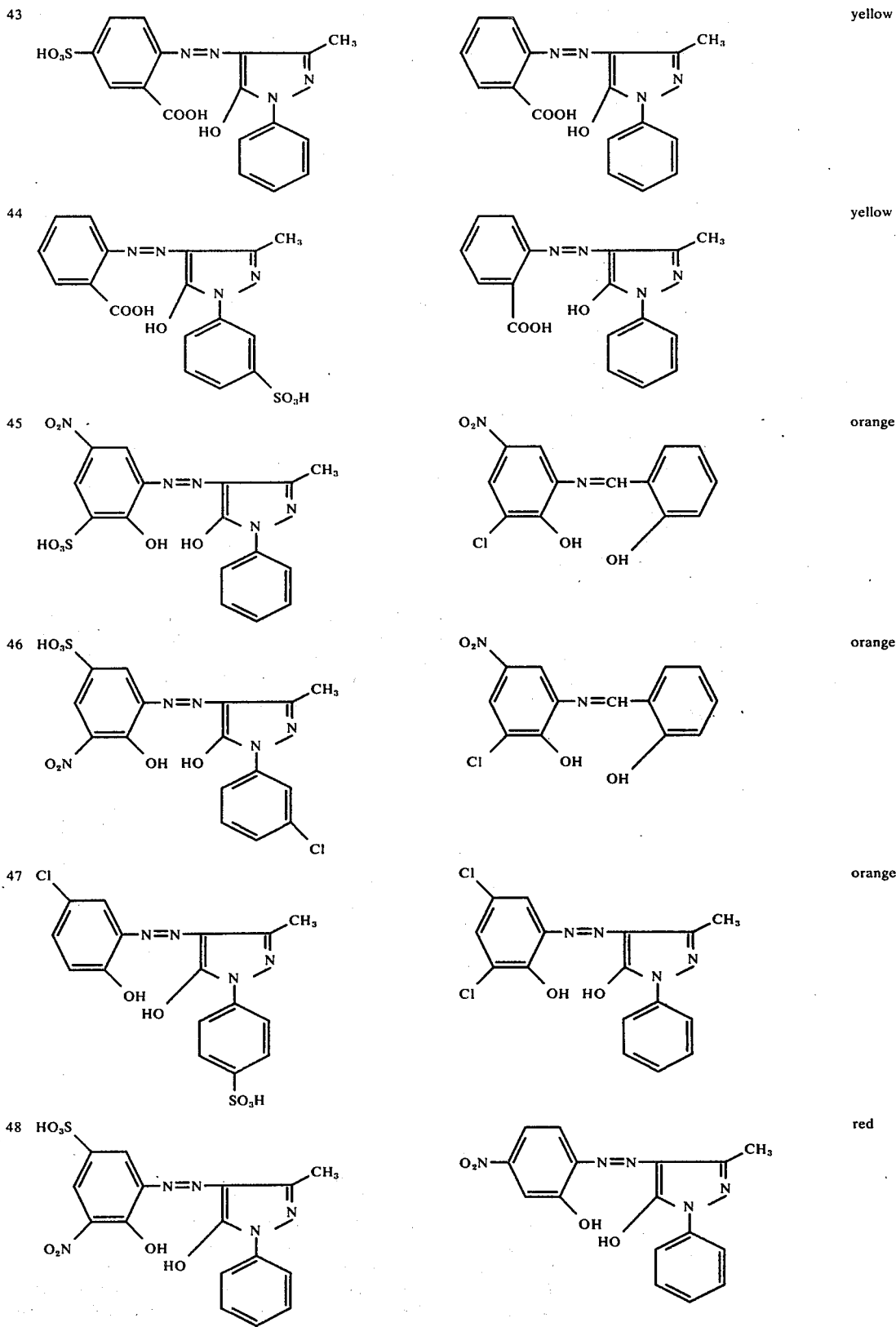

-continued
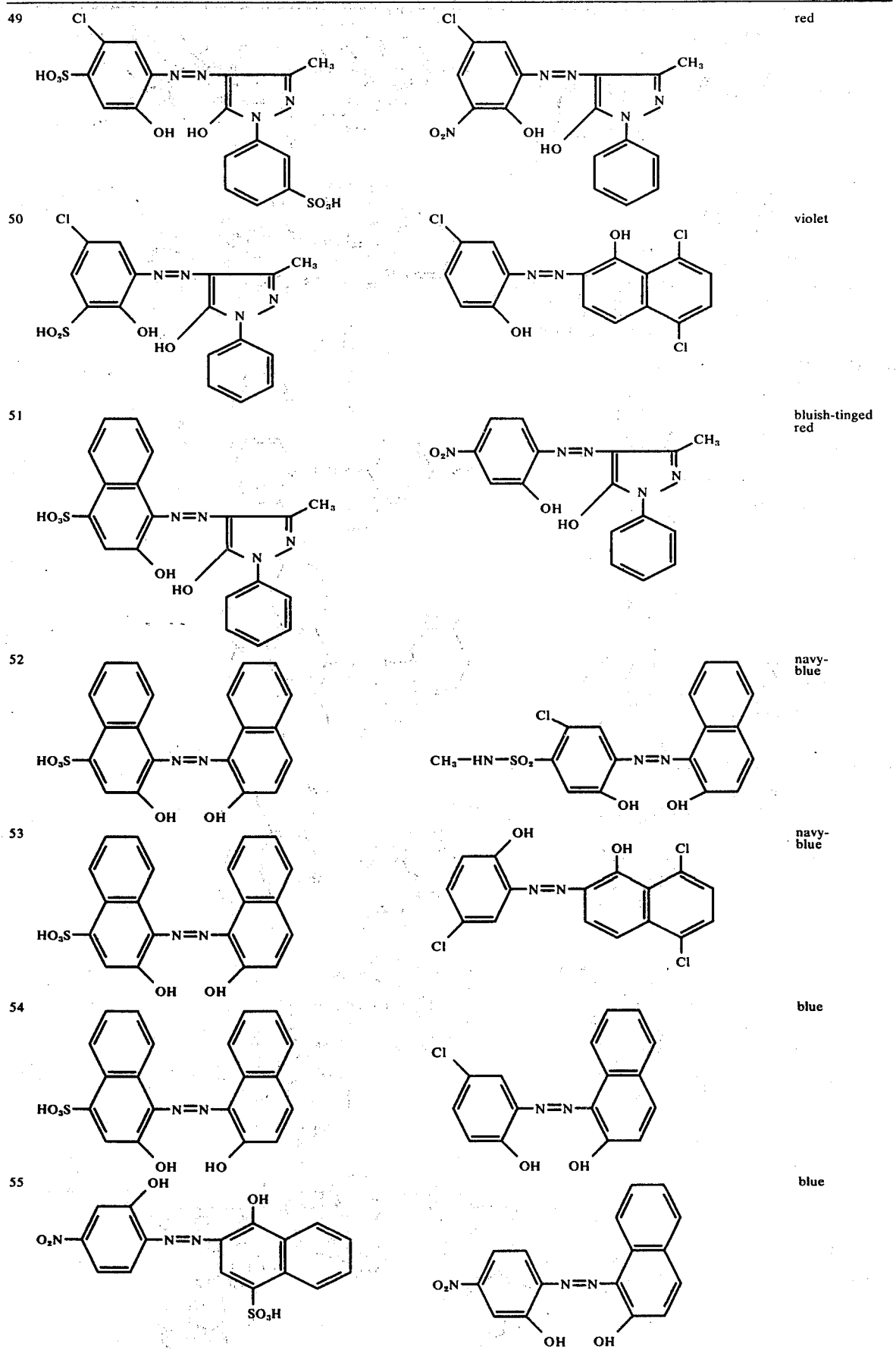

-continued
| | | | |
|---|---|---|---|
| 56 | 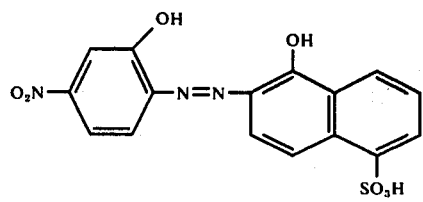 | 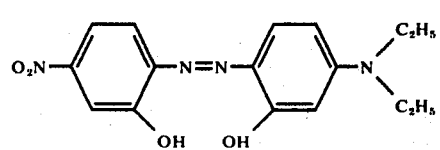 | blue |
| 57 | 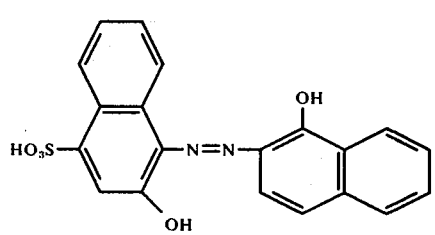 | 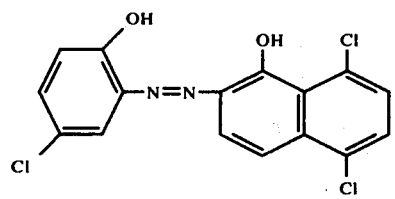 | blue |
| 58 | 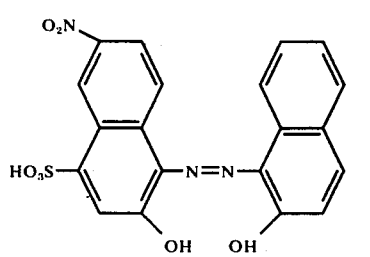 | 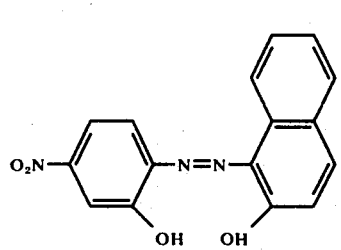 | green |
| 59 | 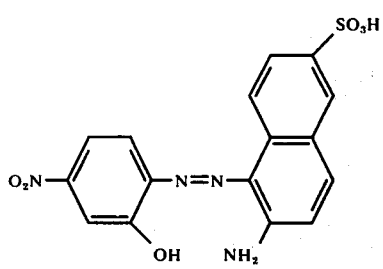 | 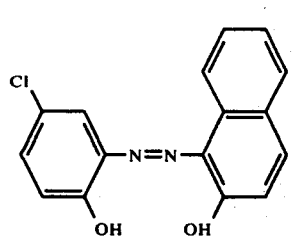 | green |
| 60 | 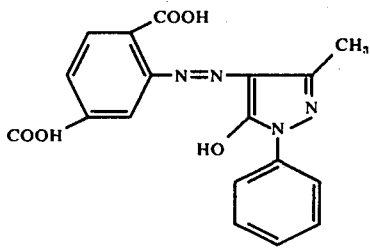 | 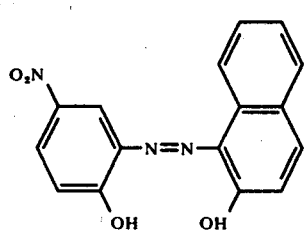 | green |
| 61 | 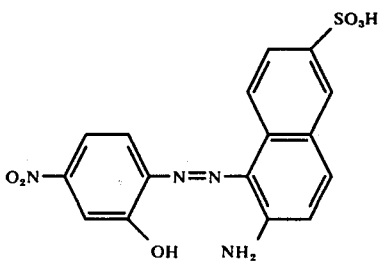 | 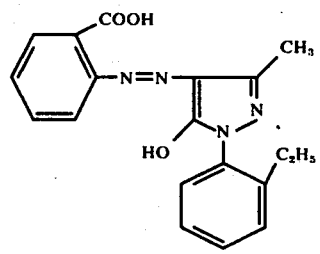 | green |
| 62 | 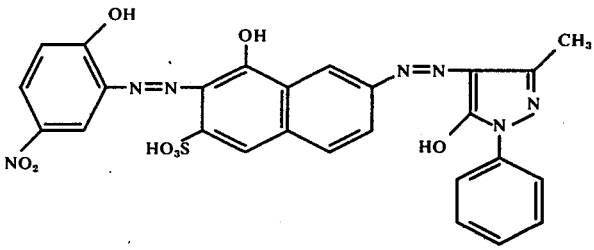 | 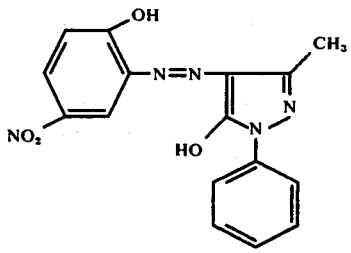 | brown |

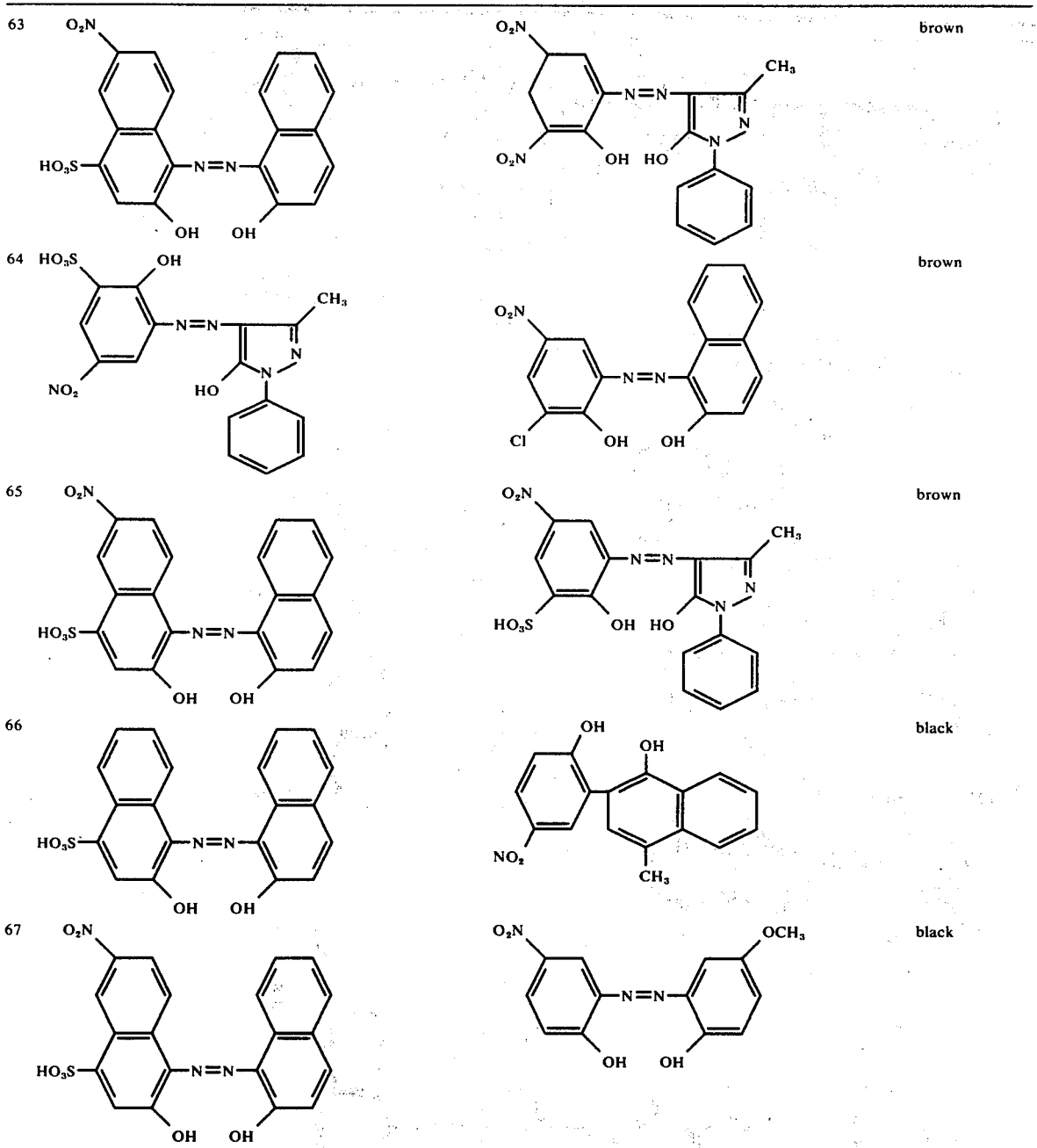

EXAMPLE 68

The moist paste of one mol of the dyestuff obtained by reaction of diazotised 4-nitro-2-aminophenol-6-sulphonic acid with 1-phenyl-3-methyl-5-pyrazolone is suspended in 500 g of diethylene glycol monoethyl ether and 1 mol of LiOH.H$_2$O. The suspension is heated to 200° C, 0.5 mol of solid CrCl$_3$.6H$_2$O is added and approx. a further two mols of LiOH.H$_2$O are added over the course of 90 minutes. A solution is formed gradually, in which metal-free compound is no longer detectable after addition of the LiOH.H$_2$O. The concentrated clear solution does not deposit any dyestuff even on prolonged storage at temperatures below the freezing point, down to −15° C, and is miscible with any desired quantity of water.

The metal-free dyestuffs or mixtures of metal-free dyestuffs, indicated in the next table can be converted similarly into the solutions of their chromium complexes, using the solvents mentioned in Example 21.

| | | |
|---|---|---|
| 69 | 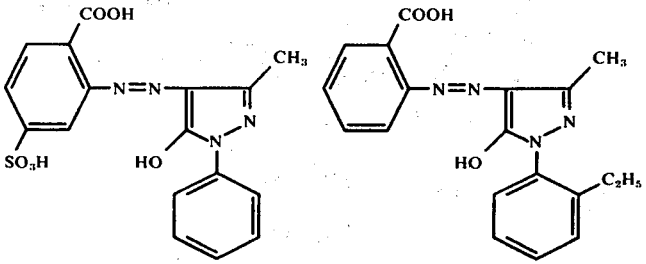 | yellow |
| 70 | 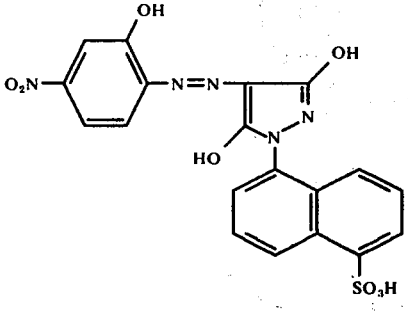 | claret |
| 71 | 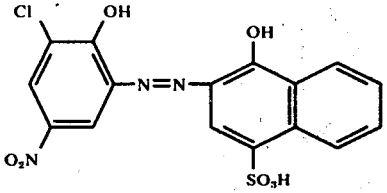 | violet |
| 72 | 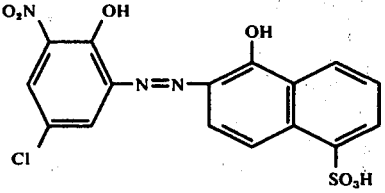 | navy-blue |
| 73 | 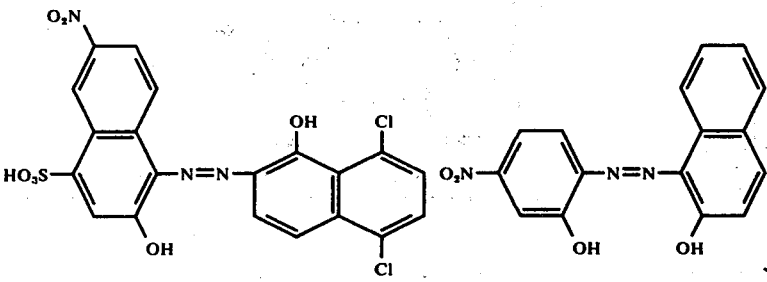 | black-blue |
| 74 | 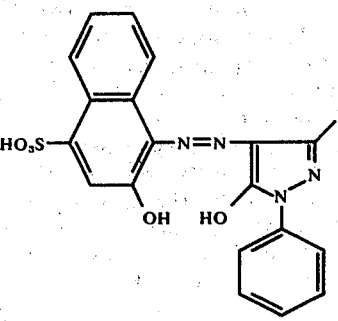 | claret |

| | | |
|---|---|---|
| 75 | 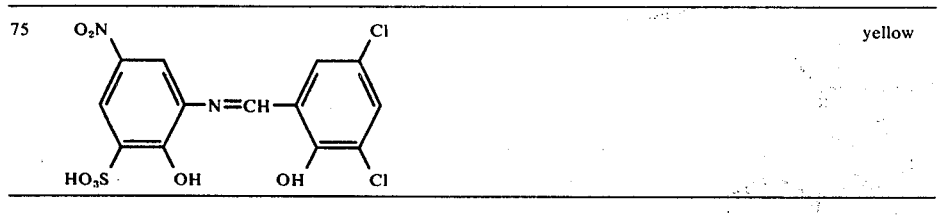 | yellow |

EXAMPLE 76

The moist paste of the sodium salt of 1 mol of monoazo dyestuff from diazotised 4-nitro-2-aminophenol-6-sulphonic acid and acetoacetic acid anilide is suspended in 500 g of ethylene glycol. 0.5 mol of $CoCl_2.6H_2O$ is added, the mixture is stirred at room temperature and the pH is kept in the range from 8 to 8.5 by addition of $LiOH.H_2O$. The cobalting reaction is complete after about 1 hour. After standing for 12 hours, small amounts of cobalt hydroxide are filtered off and a stable, concentrated solution which can be diluted with water in any proportion and by means of which wool and polyamides can be dyed in a yellow shade, is obtained.

The table which follows shows metallisable dyestuffs which can be converted analogously into the concentrated solutions of their cobalt complexes by using lithium hydroxide or other lithium salts which are alkaline in water, and using the solvents listed in Example 1.

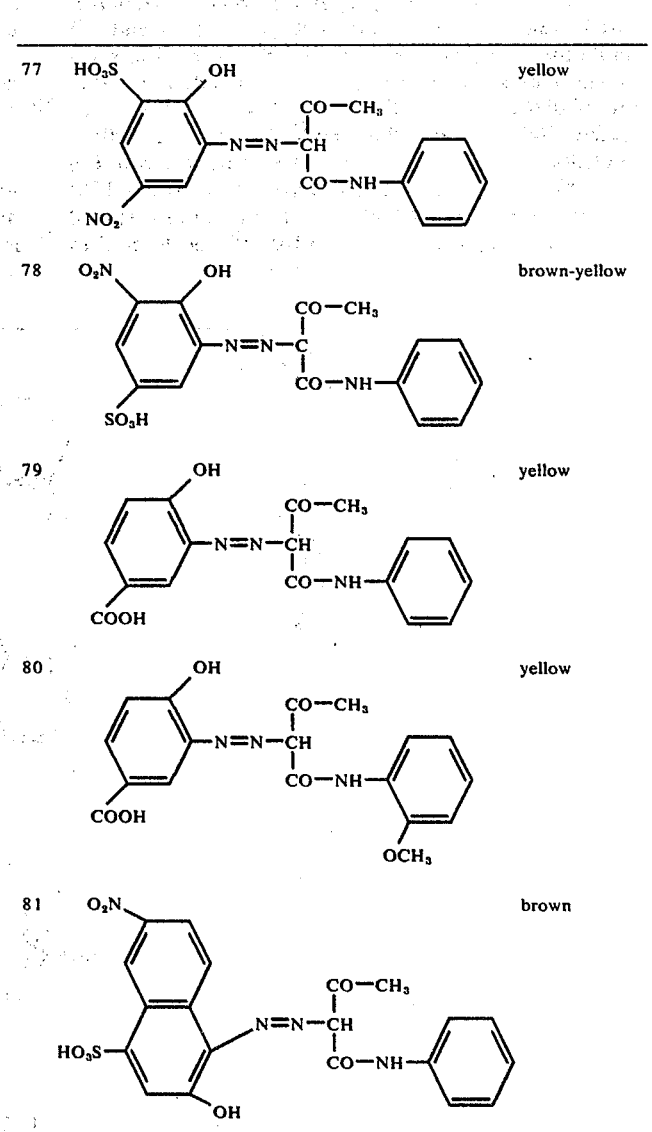

| | | |
|---|---|---|
| 82 | 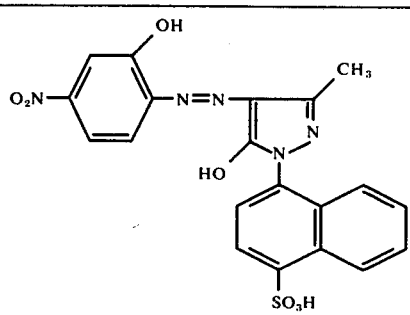 | brown-red |
| 83 | 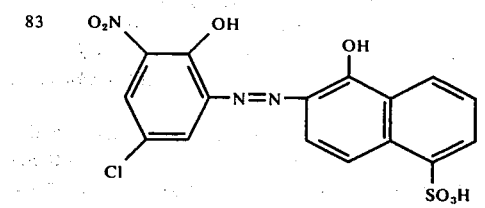 | claret |

EXAMPLE 84

0.5 mol of the dyestuff prepared by reaction of diazotised 4-nitro-2-aminophenol with β-naphthol and 0.5 mol of the dyestuff prepared from diazotised 5-nitro-2-aminophenol and β-naphthol are suspended in 1,000 ml of diethylene glycol monoethyl ether. 1.5 mols of LiOH.H$_2$O are added, the whole is warmed to 100° C and 360 g of an aqueous chromium acetate solution (10.5% Cr$_2$O$_3$) are then allowed to run in at 100° – 120° C over the course of 20 minutes. The mixture is stirred for 1 hour longer at the boil and is allowed to cool to room temperature, the salts which have precipitated are filtered off and a concentrated black solution is obtained, from which dyestuff can no longer be precipitated by dilution with water.

Black dyeings on wool and polyamide can be produced in aqueous dye baths by using the solution thus obtainable.

Comparably concentrated water-soluble solutions of water-insoluble dyestuffs can be prepared similarly in solvents containing hydroxyl groups, using lithium hydroxide as the base. The next table shows the chromium complexes or cobalt complexes of such solutions and the shade of these dyestuffs.

| | | |
|---|---|---|
| 85 | 1 : 2 Cobalt complex of 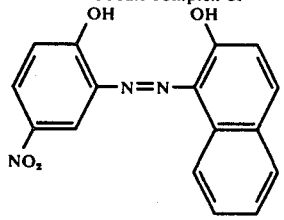 | claret |
| 86 | 1 : 2 Cobalt complex of 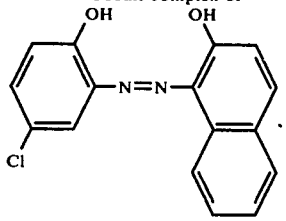 | red-violet |
| 87 | 1 : 2 Chromium complex of 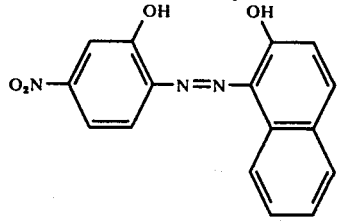 | grey |

1 : 2 Cobalt complex of

| | | |
|---|---|---|
| 88 | 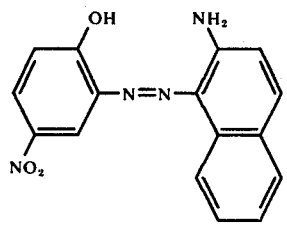 | blue-grey |
| | 1 : 2 Chromium complex of | |
| 89 | 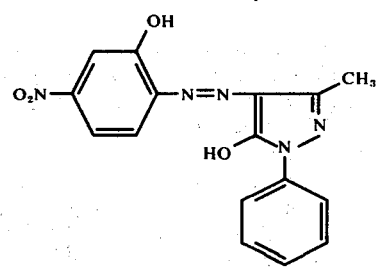 | red |
| | 1 : 2 Chromium complex of | |
| 90 | 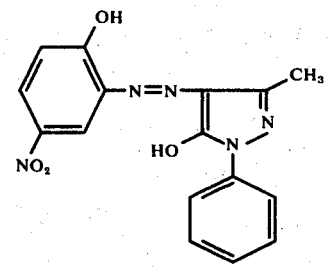 | orange-red |
| | 1 : 2 Chromium complex of | |
| 91 | 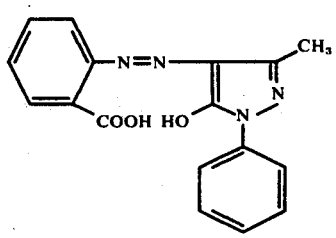 | yellow |
| | 1 : 2 Cobalt complex of | |
| 92 | 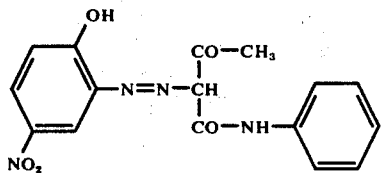 | reddish-tinged yellow |
| | Chromium complex of the mixture (20:28:52) of the dyestuffs | |
| 93 | 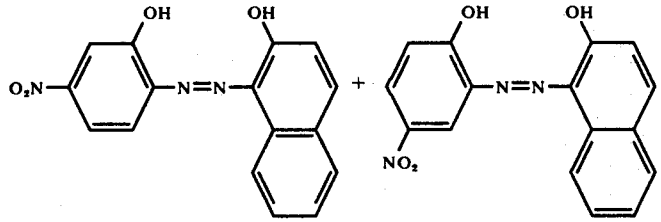 | dark brown |

-continued

+ 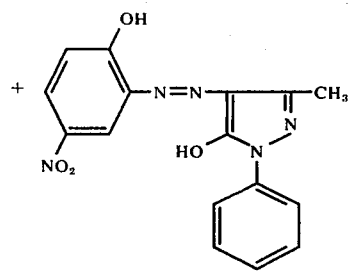

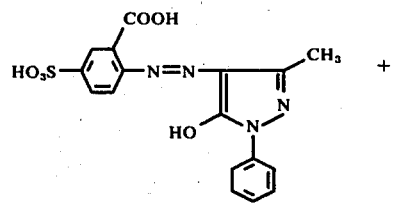

-continued
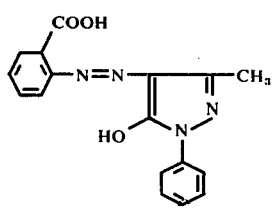
17. Lithium salt of the chromium complex of the mixtures of the dyestuffs of the formulae
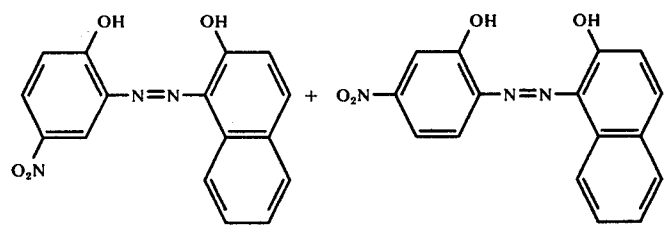
18. Lithium salt of the chromium complex of the mixtures of the dyestuffs of the formulae
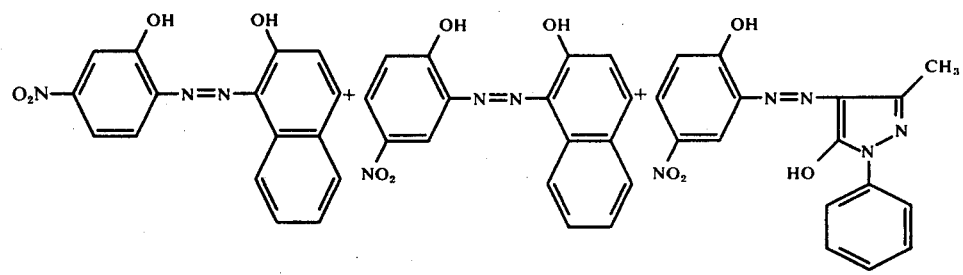

We claim:

1. The lithium salt of a 1:2 chromium or 1:2 cobalt complex of a monoazo or azomethine dyestuff which before metallization contains a O,O'-dihydroxy-O-hydroxy-O'-amino-azo or -azomethine group.

2. A concentrated solution comprising the dyestuff of claim 1 in the form of the lithium salt thereof, and an organic solvent containing at least one hydroxyl group.

3. The concentrated solution of claim 2 further comprising water.

4. A concentrated solution comprising the dyestuff of claim 1, an organic solvent containing at least one hydroxyl group, and a lithium salt alkaline in water.

5. The concentrated solution of claim 4, further comprising water.

6. The concentrated solution of claim 2, wherein said organic solvent comprises alcohol; glycol, including a mono-ether or mono-ester thereof; dihydroxy-ether, including a mono-ether or mono-ester thereof; dihydroxy polyether, including a mono-ether or mono-ester thereof; or a polyhydroxy compound which is liquid at 25° C, including an ether or ester thereof.

7. The concentrated solution of claim 3, wherein said organic solvent comprises alcohol; glycol, including a mono-ether or mono-ester thereof; dihydroxy-ether, including a mono-ether or mono-ester thereof; dihydroxy polyether, including a mono-ether or mono-ester thereof; or a polyhydroxy compound which is liquid at 25° C, including an ether or ester thereof.

8. The concentrated solution of claim 4, wherein said organic solvent comprises alcohol; glycol, including a mono-ether or mono-ester thereof; dihydroxy-ether, including a mono-ether or mono-ester thereof; dihydroxy polyether, including a mono-ether or mono-ester thereof; or a polyhydroxy compound which is liquid at 25° C, including an ether or ester thereof.

9. The concentrated solution of claim 5, wherein said organic solvent comprises alcohol; glycol, including a mono-ether or mono-ester thereof; dihydroxy-ether, including a mono-ether or mono-ester thereof; dihydroxy polyether, including a mono-ether or mono-ester thereof; or a polyhydroxy compound which is liquid at 25° C, including an ether or ester thereof.

10. A concentrated solution comprising 10–40% by weight of the metal complex dyestuff of claim 1, 0–50% by weight of water, 20–80% by weight of an organic solvent containing at least one hydroxyl group, and 2–12% by weight of a lithium salt which is alkaline in water.

11. Process for the preparation of dye baths and printing pastes for dyeing and printing fibrous materials containing nitrogen employing the concentrated solution of claim 2.

12. Concentrated solution according to claim 2, characterised in that they contain 10 – 40% by weight of a metal complex dyestuff, 0 – 50% by weight of water, 20 – 80% by weight of an organic solvent containing hydroxyl groups and 2 – 12% by weight of the lithium salt which is alkaline in water.

13. Process for the preparation of concentrated solutions of 1:2-azo- and azomethine complex dyestuffs, characterized in that the metallisable dyestuffs are chromated in hydroxyl group containing solvents in the presence of alkaline lithium salts with chromium acetate or chromium formate.

14. Lithium salt of the cobalt complex of the dyestuff of the formula

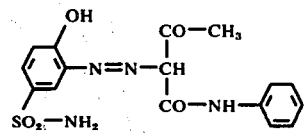

15. Lithium salt of the chromium complex of the mixtures of the dyestuffs of the formulae

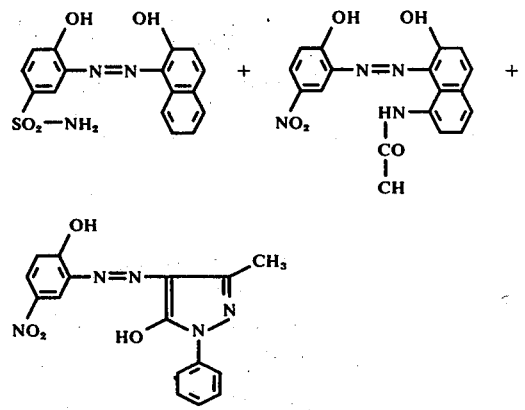

16. Lithium salt of the chromium complex of the mixtures of the dyestuffs of the formulae